(12) United States Patent  
Lee

(10) Patent No.: US 10,300,809 B2  
(45) Date of Patent: May 28, 2019

(54) CONTROL SYSTEM FOR ELECTRIC BICYCLES

(71) Applicant: Wen-Sung Lee, Taichung (TW)

(72) Inventor: Wen-Sung Lee, Taichung (TW)

(73) Assignee: GUAN HUNG TECHNOLOGY CO., LTD., Taichung ( * ) Notice: Subject to any disclaimer, the term of this patent is extended or adjusted under 35 U.S.C. 154(b) by 56 days.

(21) Appl. No.: 15/592,174

(22) Filed: May 10, 2017

(65) Prior Publication Data

US 2018/0326868 A1    Nov. 15, 2018

(51) Int. Cl.
| | |
|---|---|
| *B60L 15/20* | (2006.01) |
| *B62J 99/00* | (2009.01) |
| *B62M 6/45* | (2010.01) |
| *B62M 6/90* | (2010.01) |
| *B60L 58/10* | (2019.01) |
| *H04W 88/02* | (2009.01) |
| *H04W 4/80* | (2018.01) |

(52) U.S. Cl.
CPC .............. *B60L 15/20* (2013.01); *B60L 58/10* (2019.02); *B62J 99/00* (2013.01); *B62M 6/45* (2013.01); *B62M 6/90* (2013.01); *B60L 2200/12* (2013.01); *B62J 2099/002* (2013.01); *B62J 2099/004* (2013.01); *B62J 2099/0013* (2013.01); *H04W 4/80* (2018.02); *H04W 88/02* (2013.01)

(58) Field of Classification Search
CPC ........ B60L 15/20; B60L 11/1851; B62J 99/00
See application file for complete search history.

(56) References Cited

U.S. PATENT DOCUMENTS

2017/0106866 A1* 4/2017 Schieffelin ............. B62M 9/122

* cited by examiner

*Primary Examiner* — Basil T. Jos

(57) ABSTRACT

A control system includes a bicycle includes a crank, a motor and a battery which provides power to the motor. An acceleration detector is connected to the bicycle and detects the riding acceleration of the bicycle. A torque detector is connected to the bicycle and consistently detects treading of the crank and generates multiple instant treading torque values. A controller is connected to the bicycle and electrically connected to the motor, the battery, the acceleration detector and the torque detector, and receives the riding acceleration, the treading acceleration and the instant treading torque values so as to control output of the motor and the battery instantly.

8 Claims, 9 Drawing Sheets

CONTROL SYSTEM FOR ELECTRIC BICYCLES

BACKGROUND OF THE INVENTION

1. Fields of the Invention

The present invention relates to a control system for an electric bicycle, and more particularly, to a control system for an electric bicycle which provides assistance in time to help the users to operate the bicycle easily and conveniently.

2. Descriptions of Related Art

The conventional control systems for electric bicycles provide multiple operational molds so that the users choose one of the operational molds manually. However, the users have to spend time to learn how to choose a suitable operational mold when using the control system. This becomes a burden for some users.

Generally, the control system is cooperated with a gear system to provide assistance to operate the electric bicycle. The gear system is complicated for most of the users so that the users need a period of time to learn how to choose a proper operational mold, and once the users choose an improper operational mold, the operation to the electric bicycles cannot meet the users' needs such as in a rush hour in traffic.

The present invention intends to provide a control system for an electric bicycle to eliminate the shortcomings mentioned above.

SUMMARY OF THE INVENTION

The present invention relates to a control system and comprises a bicycle having a crank, a motor and a battery which provides power to the motor. An acceleration detector is connected to the bicycle and detects the riding acceleration of the bicycle, and the treading acceleration from the crank of the bicycle. A torque detector is connected to the bicycle and consistently detects the treading of the crank and generates multiple instant treading torque values. A controller is connected to the bicycle and electrically connected to the motor, the battery, the acceleration detector and the torque detector. The controller receives the riding acceleration, the treading acceleration and the instant treading torque values, and sends adjustment signals to the motor and the battery to control output of the motor and the battery.

When the treading acceleration is higher than the riding acceleration, the controller judges that resistance to the bicycle is increased so that the output of the motor and the battery is increased. When the treading acceleration is lower than the riding acceleration, the controller judges that resistance to the bicycle is reduced so that the output of the motor and the battery is reduced. When the treading acceleration is lower than the riding acceleration, and the instant treading torque values increase, the controller increases the output of the motor and the battery.

Preferably, the controller compares one of the instant treading torque values with a previous one of the instant treading torque values to judge that the whether the instant treading torque values increase or not.

Preferably, the torque detector is connected to pedals of the crank of the bicycle.

Preferably, the controller includes a pre-set torque value. When the treading acceleration is lower than the riding acceleration, and the instant treading torque values are higher than the pre-set torque value, the controller increases the output of the motor and the battery.

The present invention provides another embodiment of the control system which comprises a bicycle having a crank, a motor and a battery which provides power to the motor. A smart phone has an acceleration detector installed therein, and is installed to the bicycle. The acceleration detector detects the riding acceleration of the bicycle, and the treading acceleration from the crank of the bicycle. A torque detector is connected to the bicycle and consistently detects treading of the crank and generates multiple instant treading torque values. A controller is connected to the bicycle and electrically connected to the motor, the battery and the torque detector. The controller receives the instant treading torque values. The controller has a blue-tooth device for sending signals to the smart phone by way of wire-less. The riding acceleration and the treading acceleration detected by the acceleration detector of the smart phone are sent to the controller by the blue-tooth device. The controller sends adjustment signals to the motor and the battery to control output of the motor and the battery.

When the treading acceleration is higher than the riding acceleration, the controller judges that resistance to the bicycle is increased so that the output of the motor and the battery is increased. When the treading acceleration is lower than the riding acceleration, the controller judges that resistance to the bicycle is reduced so that the output of the motor and the battery is reduced. When the treading acceleration is lower than the riding acceleration, and the instant treading torque values increase, the controller increases the output of the motor and the battery.

Preferably, the torque detector is connected to pedals of the crank of the bicycle. The controller compares one of the instant treading torque values with a previous one of the instant treading torque values to judge that the whether the instant treading torque values increase or not.

Preferably, the controller includes a pre-set torque value. When the treading acceleration is lower than the riding acceleration, and the instant treading torque values are higher than the pre-set torque value, the controller increases the output of the motor and the battery.

The present invention further provides yet another embodiment of the control system and comprises a bicycle having a crank, a motor and a battery which provides power to the motor. A smart phone has an acceleration detector installed therein, and the smart phone is installed to the bicycle. The acceleration detector detects the riding acceleration of the bicycle, and the treading acceleration from the crank of the bicycle. A controller is connected to the bicycle and electrically connected to the motor and the battery. The controller has a blue-tooth device for sending signals to the smart phone by way of wire-less. The riding acceleration and the treading acceleration detected by the acceleration detector of the smart phone are sent to the controller by the blue-tooth device. The controller sends adjustment signals to the motor and the battery to control output of the motor and the battery.

When the treading acceleration is higher than the riding acceleration, the controller judges that resistance to the bicycle is increased so that the output of the motor and the battery is increased. When the treading acceleration is lower than the riding acceleration, the controller judges that resistance to the bicycle is reduced so that the output of the motor and the battery is reduced.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
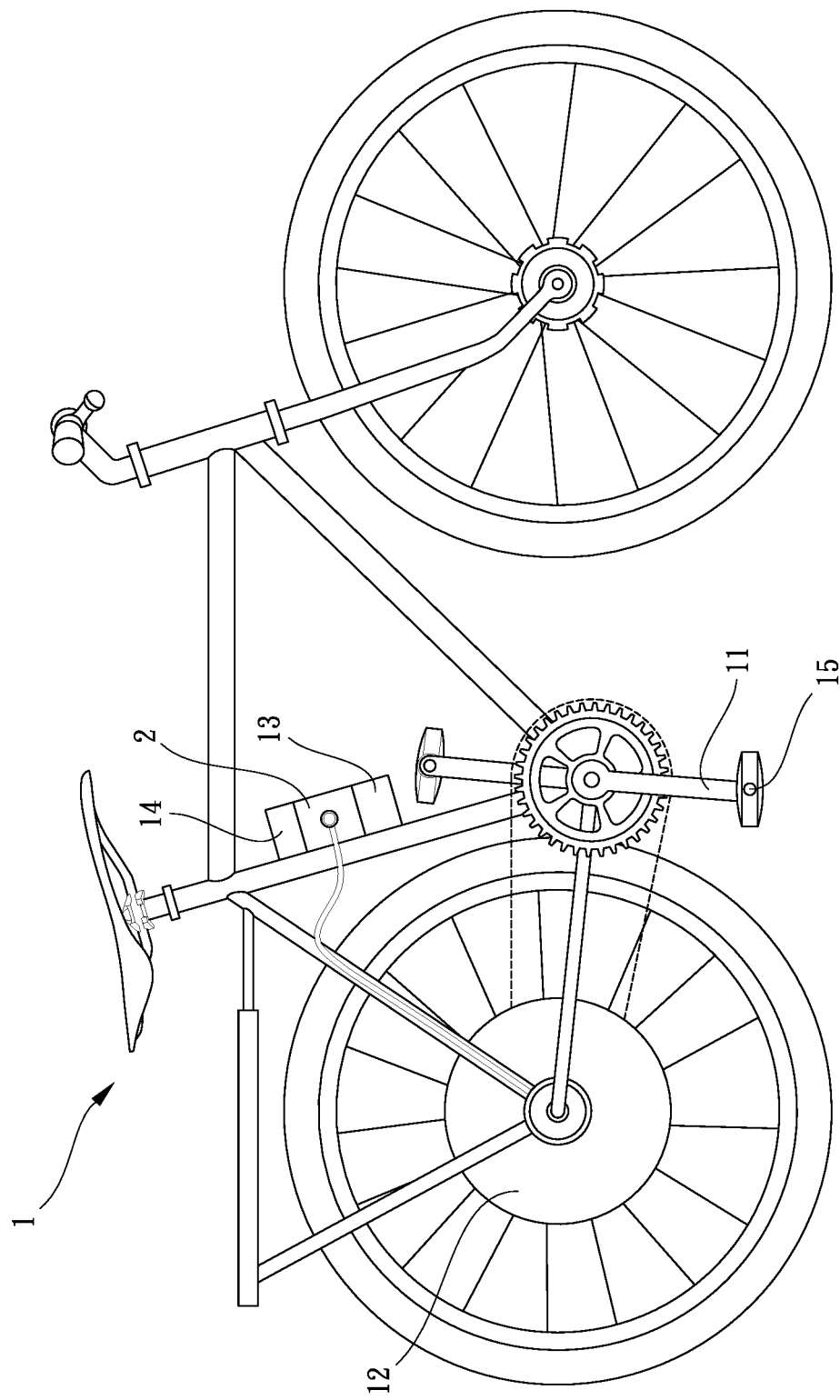
FIG. 1 shows the electric bicycle with the control system of the present invention.
Figure 2:
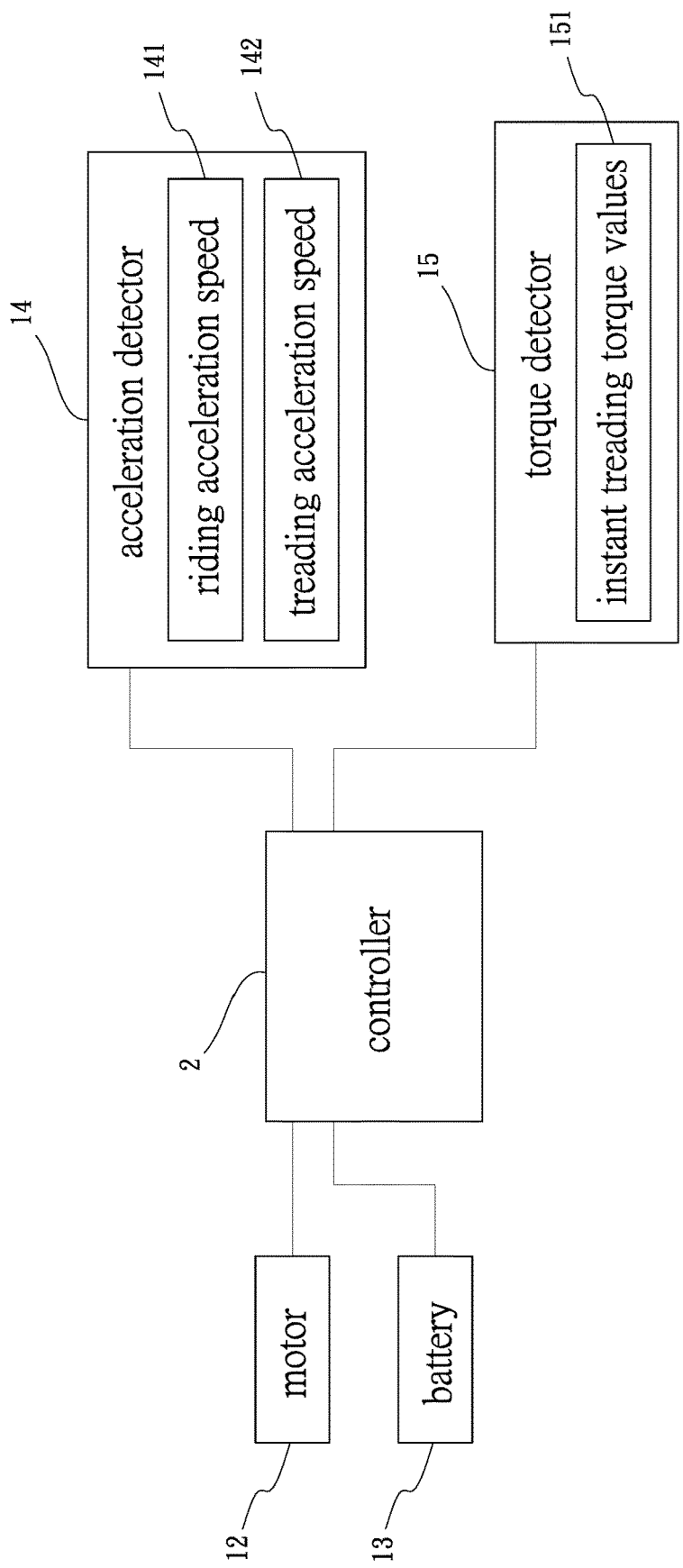
FIG. 2 illustrates the control system of the present invention.
Figure 3:
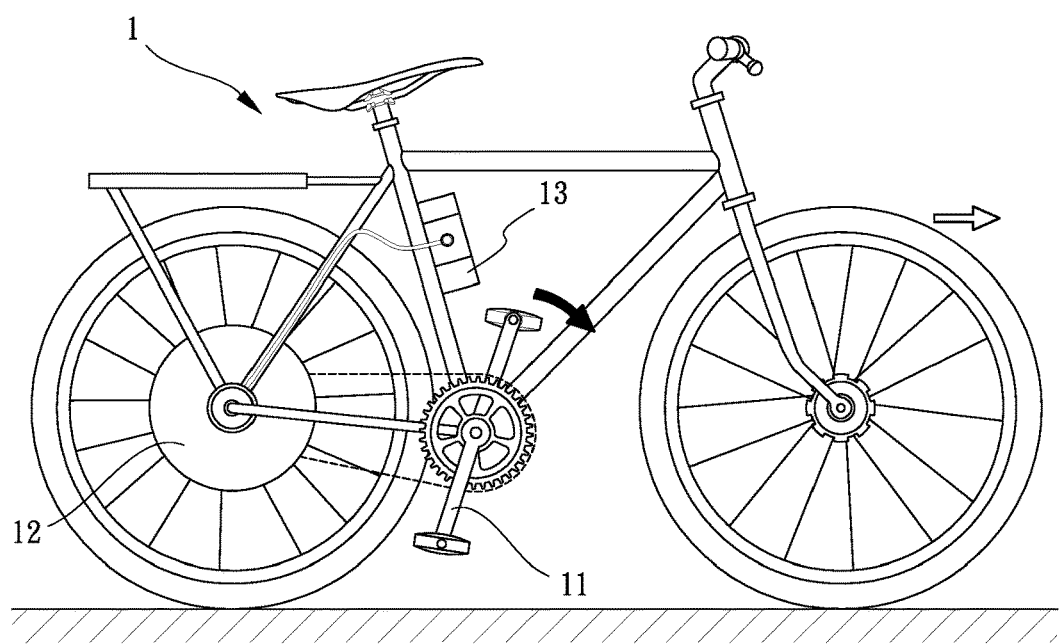
FIG. 3 shows that the electric bicycle is treaded and moves forward shown by the arrow head.

Referring to FIGS. 1 to 3, the control system of the present invention comprises a bicycle 1 having a crank 11, a motor 12 and a battery 13 which provides power to the motor 12. An acceleration detector 14 is connected to the bicycle 1 and detects the riding acceleration 141 of the bicycle 1, and the treading acceleration 142 from the crank 11 of the bicycle 1. A torque detector 15 is connected to the bicycle 1 and consistently detects the treading of the crank 11 and generates multiple instant treading torque values 151. A controller 2 is connected to the bicycle 1 and electrically connected to the motor 12, the battery 13, the acceleration detector 14 and the torque detector 15. The controller 2 receives the riding acceleration 141, the treading acceleration 142 and the instant treading torque values 151, and sends adjustment signals to the motor 12 and the battery 13 to control output of the motor 12 and the battery 13.

When the treading acceleration 142 is higher than the riding acceleration 141, the controller 2 judges that resistance to the bicycle 1 is increased so that the output of the motor 12 and the battery 13 is increased. When the treading acceleration 142 is lower than the riding acceleration 141, the controller 2 judges that resistance to the bicycle 1 is reduced so that the output of the motor 12 and the battery 13 is reduced. When the treading acceleration 142 is lower than the riding acceleration 141, and the instant treading torque values 151 increase, the controller 2 increases the output of the motor 12 and the battery 13.

Specifically, to judge that the instant treading torque values 151 increases along with time passes, the controller 2 compares one of the instant treading torque values 151 with a previous one of the instant treading torque values 151 to judge that the whether the instant treading torque values 151 increase or not. The torque detector 15 is connected to pedals of the crank 11 of the bicycle 1.

Figure 3A:
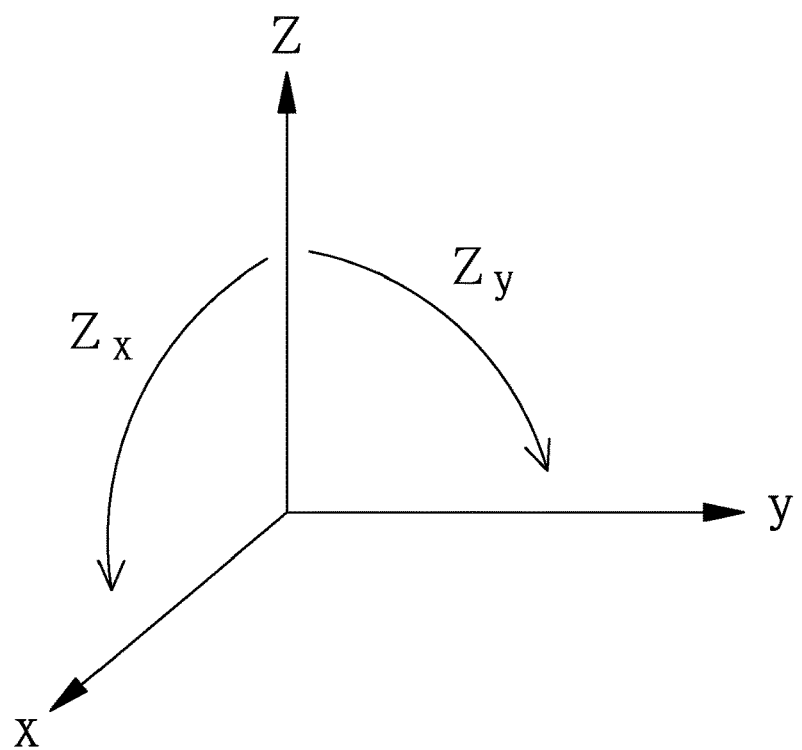
FIG. 3A shows the component forces of the treading force in Y-axis and X-axis.

The work for the force applied to the bicycle 1 to overcome resistance so as to move the bicycle 1 forward equal to the product of force (F) and velocity (v), wherein the (F) includes the treading force, the initial force and the force from the motor 12. The treading force and the force from the motor 12 have inverse proportional relationship. When the user treads the crank 11 along the direction of the solid arrow head to move the bicycle 1 along the direction of the hollow arrow head (Y-axis). The acceleration detector 14 detects a treading acceleration 142 in the direction of Y-axis as shown in FIG. 3A, and the treading acceleration 142 is composed of the component in ZY direction and the component in ZX direction. The ratio between the component in ZY direction and the component in ZX direction is compared with the riding acceleration 141, the result is provided to the controller 2 to make judgement.

The acceleration detector 14 detects the component in ZY direction and the component in ZX direction of the treading acceleration 142, such that the controller 2 responds to the weight of the user and the road condition to adjust the response of the motor 12 and the battery 13. When the treading acceleration 142 is higher than the riding acceleration 141, the controller 2 judges that resistance to the bicycle 1 is increased so that the output of the motor 12 and the battery 13 is increased to assist the user to tread the bicycle 1 easily.

When the treading acceleration 142 is lower than the riding acceleration 141, the controller 2 judges that resistance to the bicycle 1 is reduced so that the output of the motor 12 and the battery 13 is reduced. This balances the output of the battery 13 and prolong the life of use of the battery 13. When the bicycle 1 is operated along a downhill road, due to the initial force so that the treading action is reduced, and the torque detector 15 detects the change, the output of the motor 12 and the battery 13 is reduced to save energy.

When the treading acceleration 142 is lower than the riding acceleration 141, and the instant treading torque values 151 increase, the controller 2 increases the output of the motor 12 and the battery 13. This feature makes the bicycle 1 to instantly respond the situation and allows the user to operate the bicycle 1 easily.

Figure 4:
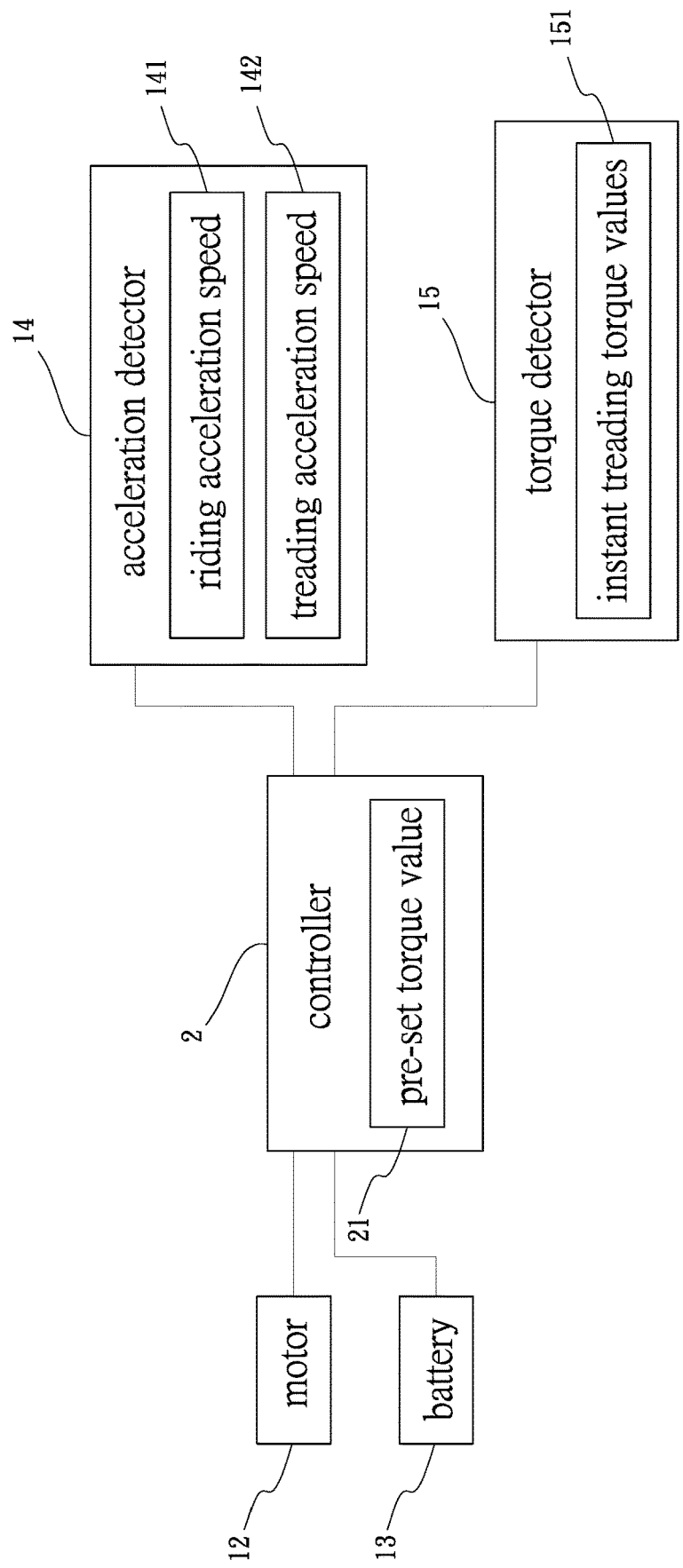
FIG. 4 illustrates that the control system of the present invention uses comparison to the pre-set torque value to assist the operation of the control system.

As shown in FIG. 4, the controller 2 includes a pre-set torque value 21. When the treading acceleration 142 is lower than the riding acceleration 141, and the instant treading torque values 151 are higher than the pre-set torque value 21, the controller 2 increases the output of the motor 12 and the battery 13.

Figure 5:
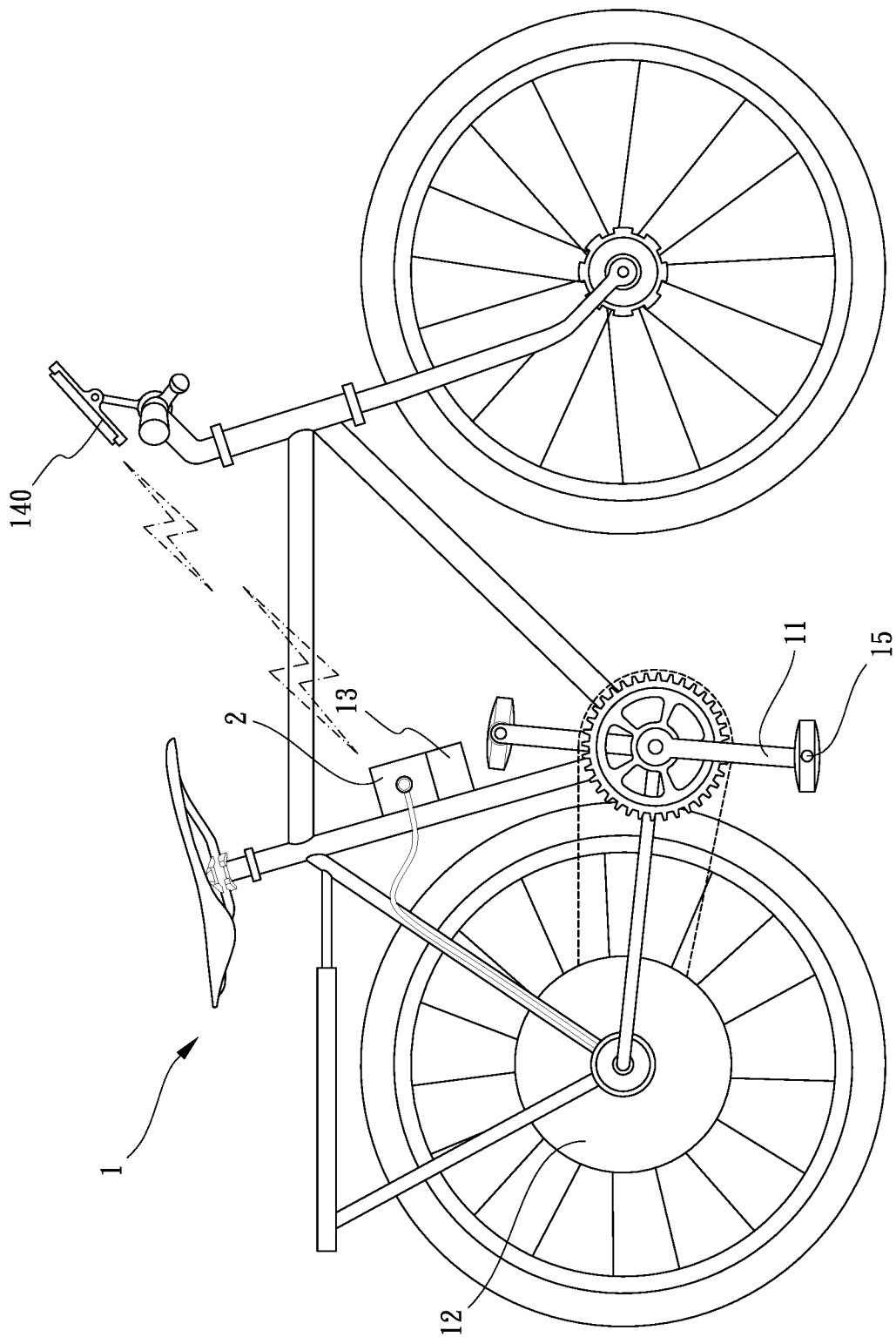
FIG. 5 shows the electric bicycle with the second embodiment of the control system of the present invention.
Figure 6:
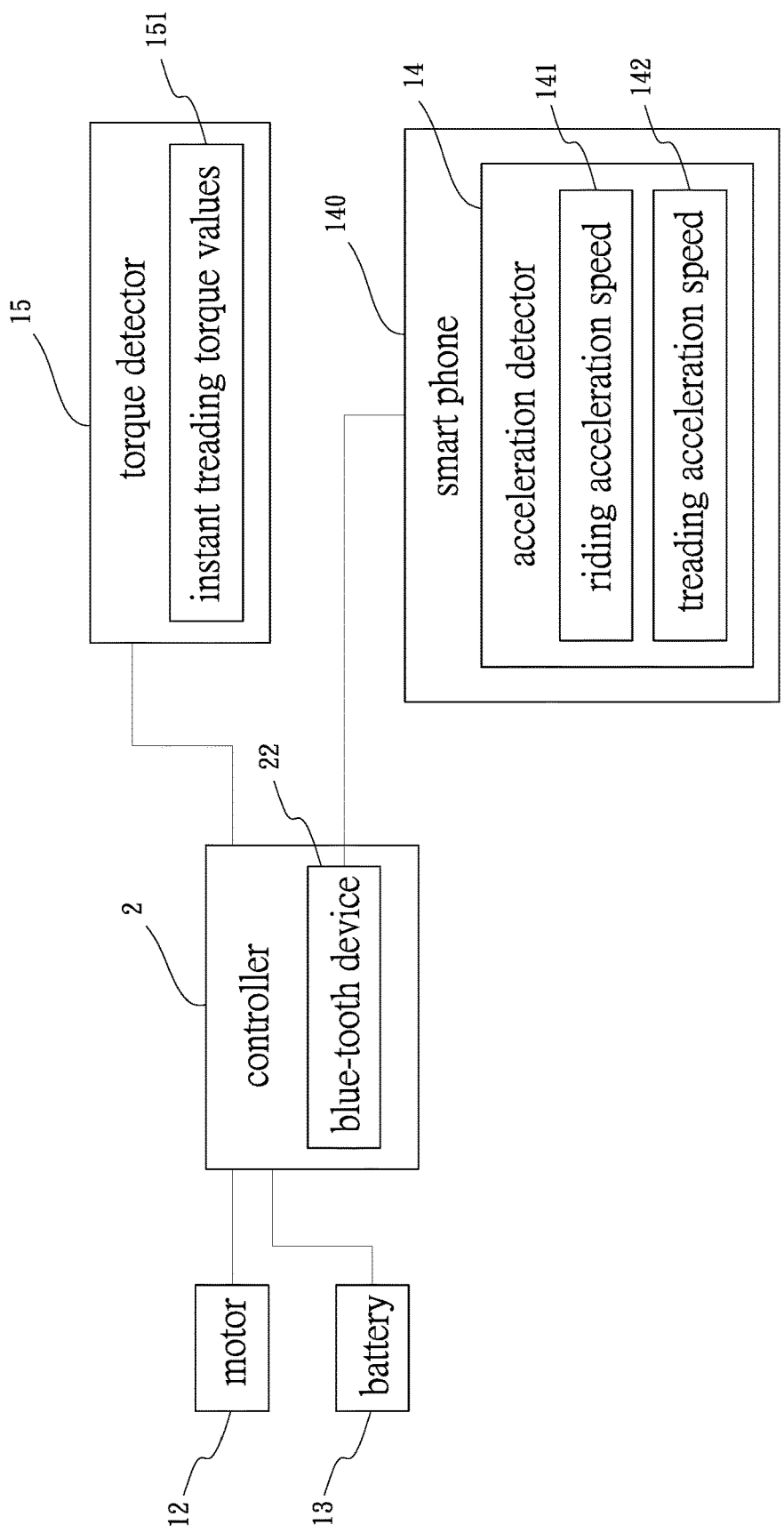
FIG. 6 illustrates the control system of the present invention in FIG. 5.

As shown in FIGS. 5 and 6, another embodiment of the control system is disclosed and comprises a bicycle 1 having a crank 11, a motor 12 and a battery which provides power to the motor 12. A smart phone 140 has an acceleration detector 14 installed therein, and is installed to the bicycle 1. The acceleration detector 14 detects the riding acceleration 141 of the bicycle 1, and the treading acceleration 142 from the crank 11 of the bicycle 1. A torque detector 15 is connected to the bicycle 1 and consistently detects treading of the crank 11 and generates multiple instant treading torque values 151. A controller 2 is connected to the bicycle 1 and electrically connected to the motor 12, the battery 13 and the torque detector 15. The controller 2 receives the instant treading torque values 151. The controller 2 has a blue-tooth device for sending signals to the smart phone 140 by way of wire-less. The riding acceleration 141 and the treading acceleration 142 detected by the acceleration detector 14 of the smart phone 140 are sent to the controller 2 by the blue-tooth device. The controller 2 sends adjustment signals to the motor 12 and the battery 13 to control output of the motor 12 and the battery 13.

When the treading acceleration 142 is higher than the riding acceleration 141, the controller 2 judges that resistance to the bicycle 1 is increased so that the output of the motor 12 and the battery 13 is increased. When the treading acceleration 142 is lower than the riding acceleration 141, the controller 2 judges that resistance to the bicycle 1 is reduced so that the output of the motor 12 and the battery 13 is reduced. When the treading acceleration 142 is lower than the riding acceleration 141, and the instant treading torque values 151 increase, the controller 2 increases the output of the motor 12 and the battery 13.

The torque detector 15 is connected to pedals of the crank 11 of the bicycle 1. The controller 2 compares one of the instant treading torque values 151 with a previous one of the instant treading torque values 151 to judge that the whether the instant treading torque values 151 increase or not.

Figure 7:
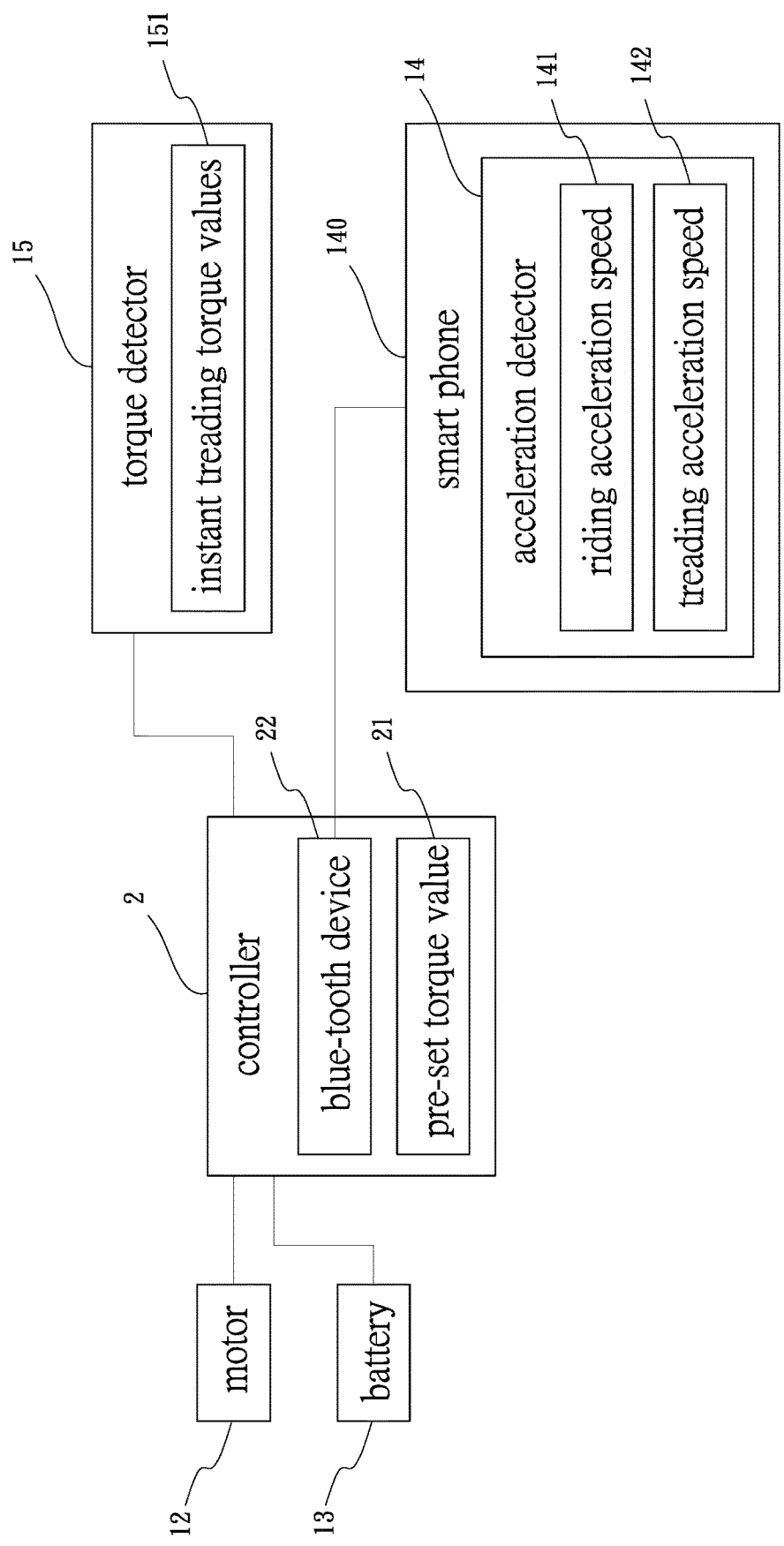
FIG. 7 illustrates that the control system of the present invention in FIG. 5 uses comparison to the pre-set torque value to assist the operation of the control system.

As shown in FIG. 7, the controller 2 includes a pre-set torque value 21. When the treading acceleration 142 is lower than the riding acceleration 141, and the instant treading torque values 151 are higher than the pre-set torque value 21, the controller 2 increases the output of the motor 12 and the battery 13.

Figure 8:
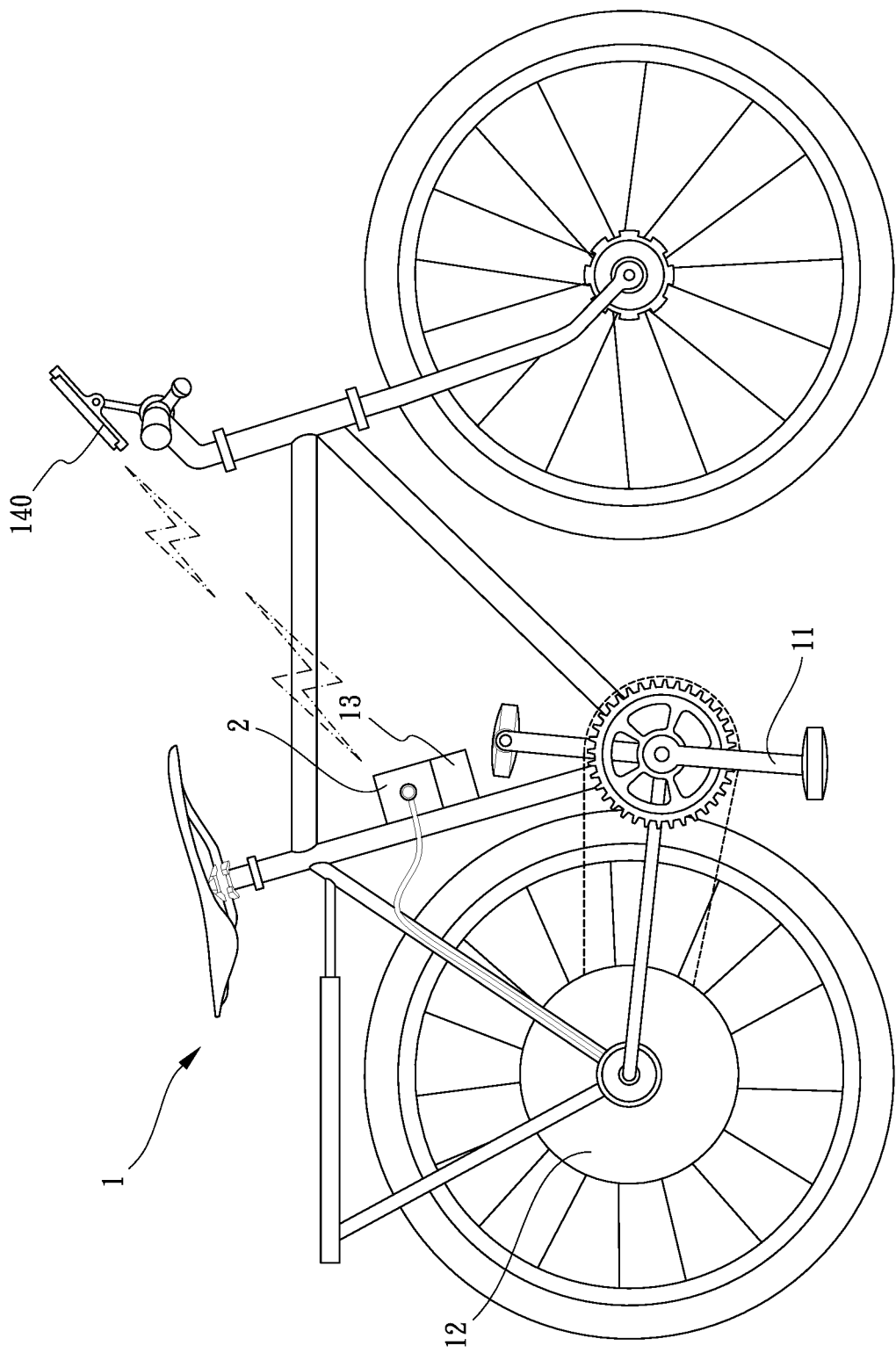
FIG. 8 shows the electric bicycle with the third embodiment of the control system of the present invention.
Figure 9:
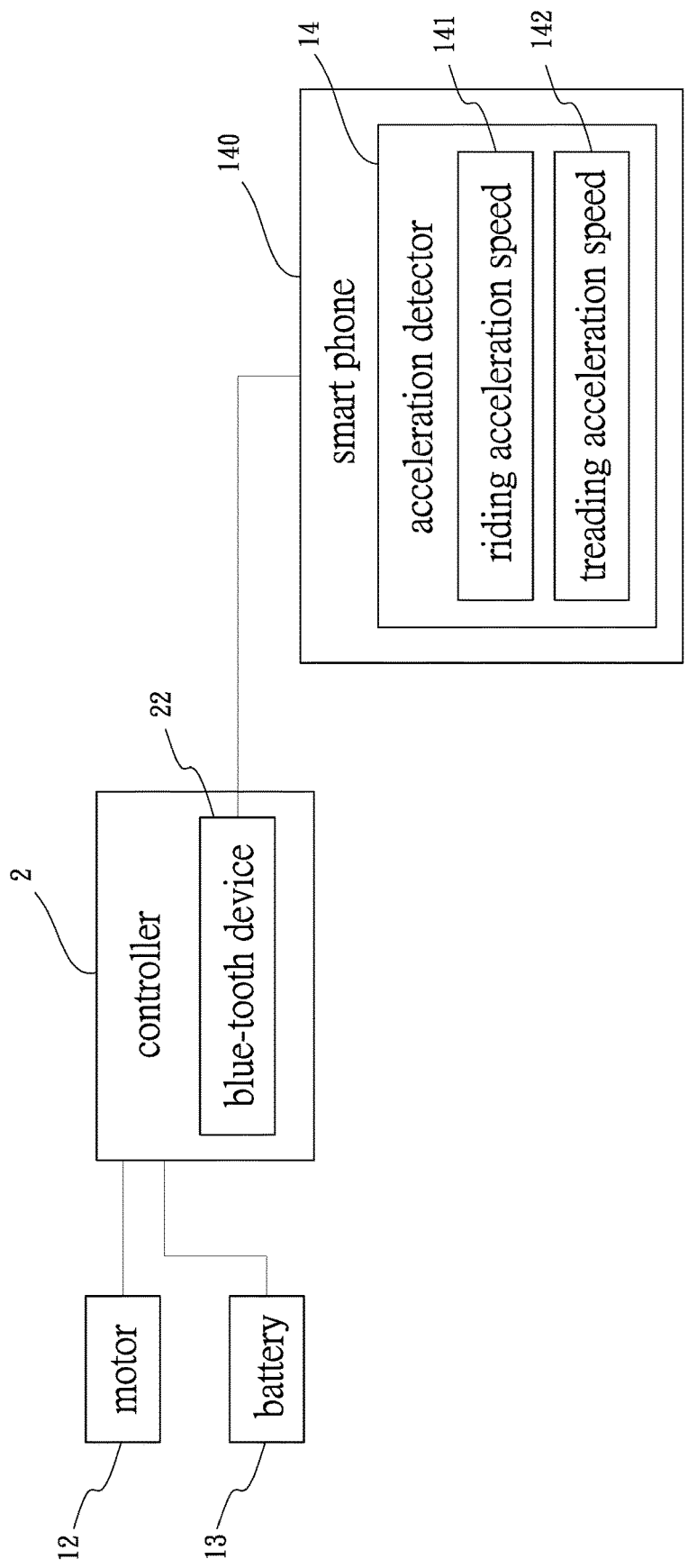
FIG. 9 illustrates the control system of the present invention n FIG. 8.

As shown in FIGS. 8 and 9, this embodiment of the control system does not take the instant treading torque values in consideration, and the comprises a bicycle 1 having a crank 11, a motor 12 and a battery which provides power to the motor 12. A smart phone 140 has an acceleration detector 14 installed therein, and the smart phone 140 is installed to the bicycle 1. The acceleration detector 14 detects the riding acceleration 141 of the bicycle 1, and the treading acceleration 142 from the crank 11 of the bicycle 1. A controller 2 is connected to the bicycle 1 and electrically connected to the motor 12 and the battery 13. The controller 2 has a blue-tooth device for sending signals to the smart phone 140 by way of wire-less. The riding acceleration 141 and the treading acceleration 142 detected by the acceleration detector 14 of the smart phone 140 are sent to the controller 2 by the blue-tooth device. The controller 2 sends adjustment signals to the motor 12 and the battery 13 to control output of the motor 12 and the battery 13.

When the treading acceleration 142 is higher than the riding acceleration 141, the controller 2 judges that resistance to the bicycle 1 is increased so that the output of the motor 12 and the battery 13 is increased. When the treading acceleration 142 is lower than the riding acceleration 141, the controller 2 judges that resistance to the bicycle 1 is reduced so that the output of the motor 12 and the battery 13 is reduced.

While we have shown and described the embodiment in accordance with the present invention, it should be clear to those skilled in the art that further embodiments may be made without departing from the scope of the present invention.

What is claimed is:

1. A control system comprising:
    a bicycle (1) having a crank (11), a motor (12) and a battery (13) which provides power to the motor (12);
    an acceleration detector (14) connected to the bicycle (1) and detecting a riding acceleration (141) of the bicycle (1), and a treading acceleration (142) from the crank (11) of the bicycle (1);
    a torque detector (15) connected to the bicycle (1) and consistently detecting treading of the crank (11) and generating multiple instant treading torque values (151), and
    a controller (2) connected to the bicycle (1) and electrically connected to the motor (12), the battery, the acceleration detector (14) and the torque detector (15), the controller (2) receiving the riding acceleration (141), the treading acceleration (142) and the instant treading torque values (151), and sending adjustment signals to the motor (12) and the battery (13) to control output of the motor (12) and the battery (13), when the treading acceleration (142) is higher than the riding acceleration (141), the controller (2) judges that resistance to the bicycle (1) is increased so that the output of the motor (12) and the battery (13) is increased, when the treading acceleration (142) is lower than the riding acceleration (141), the controller (2) judges that resistance to the bicycle (1) is reduced so that the output of the motor (12) and the battery (13) is reduced, when the treading acceleration (142) is lower than the riding acceleration (141), and the instant treading torque values (151) increase, the controller (2) increases the output of the motor (12) and the battery (13).

2. The control system as claimed in claim 1, wherein the controller (2) compares one of the instant treading torque values (151) with a previous one of the instant treading torque values (151) to judge that the whether the instant treading torque values (151) increase or not.

3. The control system as claimed in claim 1, wherein the torque detector (15) is connected to pedals of the crank (11) of the bicycle (1).

4. The control system as claimed in claim 1, wherein the controller (2) includes a pre-set torque value (21), when the treading acceleration (142) is lower than the riding acceleration (141), and the instant treading torque values (151) are higher than the pre-set torque value (21), the controller (2) increases the output of the motor (12) and the battery (13).

5. A control system comprising:
    a bicycle (1) having a crank (11), a motor (12) and a battery which provides power to the motor (12);
    a smart phone (140) having an acceleration detector (14) installed therein, the smart phone (140) installed to the bicycle (1), the acceleration detector (14) detecting a riding acceleration (141) of the bicycle (1), and a treading acceleration (142) from the crank (11) of the bicycle (1);
    a torque detector (15) connected to the bicycle (1) and consistently detecting treading of the crank (11) and generating multiple instant treading torque values (151), and
    a controller (2) connected to the bicycle (1) and electrically connected to the motor (12), the battery (13) and the torque detector (15), the controller (2) receiving the instant treading torque values (151), the controller (2) having a blue-tooth device for sending signals to the smart phone (140) by way of wire-less, the riding acceleration (141) and the treading acceleration (142) detected by the acceleration detector (14) of the smart phone (140) being sent to the controller (2) by the blue-tooth device, the controller (2) sending adjustment signals to the motor (12) and the battery (13) to control output of the motor (12) and the battery (13), when the treading acceleration (142) is higher than the riding acceleration (141), the controller (2) judges that resistance to the bicycle (1) is increased so that the output of the motor (12) and the battery (13) is increased, when the treading acceleration (142) is lower than the riding acceleration (141), the controller (2) judges that resistance to the bicycle (1) is reduced so that the output of the motor (12) and the battery (13) is reduced, when the treading acceleration (142) is lower than the riding acceleration (141), and the instant treading torque values (151) increase, the controller (2) increases the output of the motor (12) and the battery (13).

6. The control system as claimed in claim 5, wherein the torque detector (15) is connected to pedals of the crank (11) of the bicycle (1), the controller (2) compares one of the instant treading torque values (151) with a previous one of the instant treading torque values (151) to judge that the whether the instant treading torque values (151) increase or not.

7. The control system as claimed in claim 5, wherein the controller (2) includes a pre-set torque value (21), when the treading acceleration (142) is lower than the riding acceleration (141), and the instant treading torque values (151) are higher than the pre-set torque value (21), the controller (2) increases the output of the motor (12) and the battery (13).

8. A control system comprising:
 a bicycle (1) having a crank (11), a motor (12) and a battery which provides power to the motor (12);
 a smart phone (140) having an acceleration detector (14) installed therein, the smart phone (140) installed to the bicycle (1), the acceleration detector (14) detecting a riding acceleration (141) of the bicycle (1), and a treading acceleration (142) from the crank (11) of the bicycle (1), and
 a controller (2) connected to the bicycle (1) and electrically connected to the motor (12) and the battery (13), the controller (2) having a blue-tooth device for sending signals to the smart phone (140) by way of wireless, the riding acceleration (141) and the treading acceleration (142) detected by the acceleration detector (14) of the smart phone (140) being sent to the controller (2) by the blue-tooth device, the controller (2) sending adjustment signals to the motor (12) and the battery (13) to control output of the motor (12) and the battery (13), when the treading acceleration (142) is higher than the riding acceleration (141), the controller (2) judges that resistance to the bicycle (1) is increased so that the output of the motor (12) and the battery (13) is increased, when the treading acceleration (142) is lower than the riding acceleration (141), the controller (2) judges that resistance to the bicycle (I) is reduced so that the output of the motor (12) and the battery (13) is reduced.

\* \* \* \* \*